March 8, 1960 R. J. MEDAL Re. 24,788
LINE VOLTAGE REGULATOR TRANSFORMER SYSTEM
Original Filed April 28, 1953
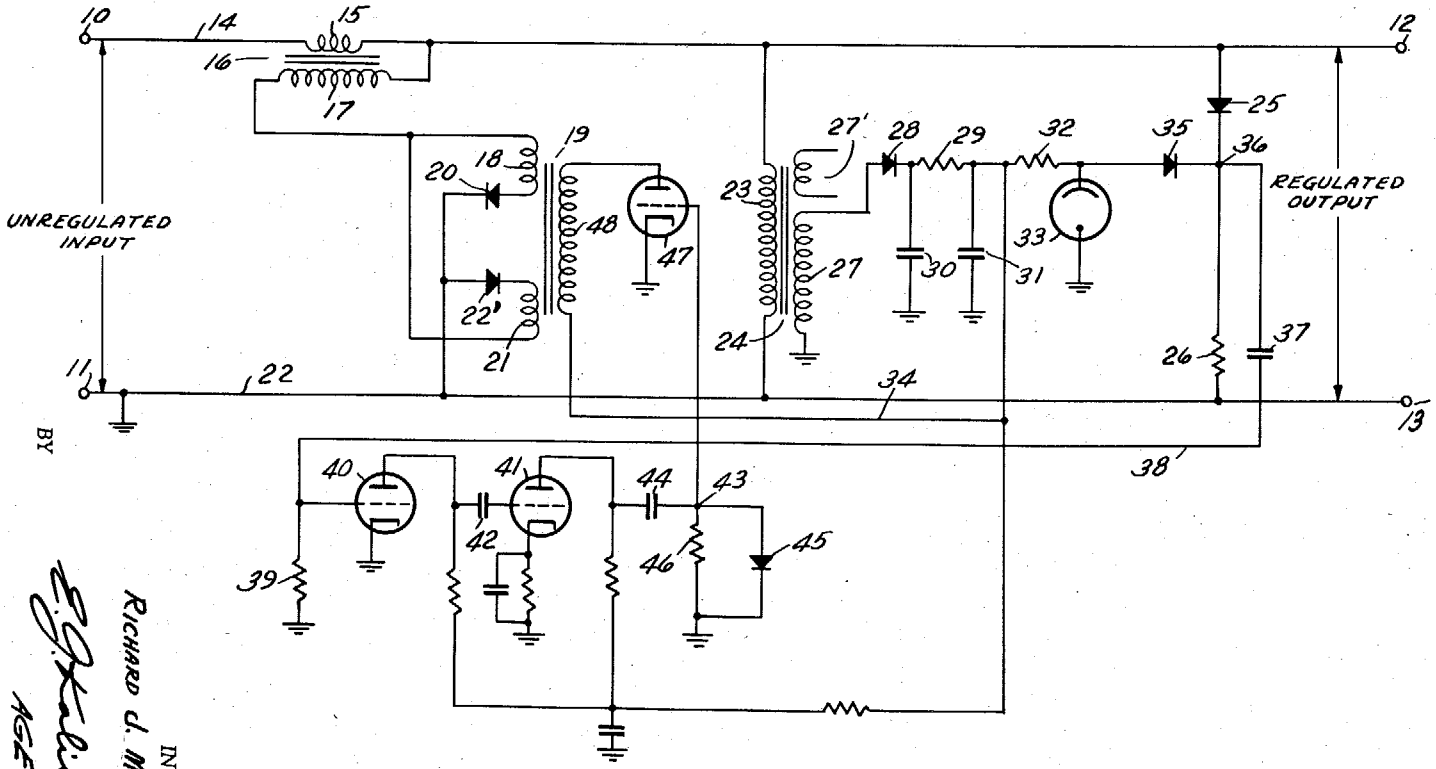
INVENTOR
RICHARD J. MEDAL
BY E. J. Kalil
AGENT United States Patent Office Re. 24,788
Reissued Mar. 8, 1960

24,788

LINE VOLTAGE REGULATOR TRANSFORMER SYSTEM

Richard J. Medal, Cook County, Ill., assignor to Rauland-Borg Corporation, Chicago, Ill.

Original No. 2,767,370, dated October 16, 1956, Serial No. 351,618, April 28, 1953. Application for reissue May 15, 1959, Serial No. 813,612

5 Claims. (Cl. 323—45)

This invention relates to new and useful improvements in alternating current regulators employing self-saturating reactors or magnetic amplifiers.

The object of the invention is a regulator circuit whose speed of response is limited only by the speed of the magnetic amplifier, which can readily handle large power (e.g. loads of several kilowatts), which employs a small number of vacuum tubes (in the example illustrated, three triodes), and which greatly amplifies the control signals and thus insures high degree of voltage regulation.

The nature of the invention will more clearly appear from the appended claims and the following detailed description of a preferred embodiment which is diagrammatically illustrated in the drawing.

In the drawing 10 and 11 are the input terminals of the regulator to which an unregulated alternating current is applied, and 12 and 13 are the output terminals from which regulated alternating current is obtained. The input circuit passes over conductor 14, the secondary winding 15 of a booster transformer 16, the primary winding 17 of said transformer 16, and then during one half cycle the upper winding 18 of a self-saturating type of reactor or magnetic amplifier 19 and a rectifier 20, and during the second half of the cycle in parallel over the lower winding 21 and a rectifier 22', and over a conductor 22 to the grounded input terminal 11. Windings 18 and 21 constitute the so-called alternating current or controlled winding of the reactor 19 and their ohmic reactance will determine the proportion of the total circuit voltage available for producing a voltage boost or drop in transformer 16. Thus, a voltage drop or boost may occur in winding 15 depending upon the degree of saturation of the reactor 19. In the voltage drop condition, the transformer winding appears as reactance in series with the load.

Primary winding 23 of a transformer 24 and a path including an impedance such as a rectifier 25 and an impedance such as a resistance 26 are connected across the output circuit. The grounded secondary winding 27 of transformer 24 will deliver positive pulses via a rectifier 28, a filter network consisting of a resistor 29 and grounded condensers 30 and 31, resistor 32 and a discharge tube, such as gas discharge diode 33 to ground. A rectifier 35 connects this circuit to the mid-point 36 between the rectifier 25 and the resistor 26. One terminal of control winding 48 of the magnetic amplifier 19 is connected via conductor 34 to diode 33.

The values in the exemplification are assumed to be so chosen that during the normal operation of the system, diode 33 maintains a constant voltage of about 150 volts and the positive pulses appearing across the resistor 26 do not exceed said 150 volts. However, when the output voltage increases, these pulses exceed 150 volts and peaks or "pips" will appear above the 150 voltage level. The pips thus derived from the output circuit are applied from point 36 over condenser 37, conductor 38, resistor 39 to ground and in parallel to the grid of an amplifier tube, in the embodiment disclosed a triode 40. The plate of triode 40 is connected in cascade via a condenser 42 with the grid of a second triode amplifier tube 41. These two tubes amplify the pips approximately 640 times. The greatly amplified pips are applied to point 43 connected between the plate of triode 41 and ground via a condenser 44, and a rectifier 45 and resistor 46 in parallel.

The grid of a control tube, in the instant embodiment a triode 47 which is connected with point 43 will thus receive greatly amplified negative pulses whereby the flow of current in the plate circuit of said tube which includes the control winding 48 of reactor 19 will be diminished. The vacuum tube cathodes may be heated by current, from the secondary 27' of transformer 24.

In proportion with the decrease of current flowing through control winding 48, the impedance of the windings 18 and 21 will be increased and the booster voltage applied via transformer 16 decreased, reducing the voltage in lines 14, 22.

I claim:

1. In an alternating current regulator having an input circuit comprising a step-up transformer having a secondary winding connected to an output circuit and a primary winding coupled to a magnetic amplifier, said magnetic amplifier having a control winding, the combination of two parallel paths across the output circuit, the first containing a primary of a transformer and the second two impedances in series, a connection from the secondary of the last mentioned transformer to the junction of said two impedances, the last mentioned connection including a rectifying and filtering means, a vacuum tube connected with said control winding, a control circuit for said tube coupled to said junction in said second path, and an amplifier in said control circuit.

2. In an alternating current regulator having an input circuit comprising a step-up transformer having a secondary winding connected to an output circuit and a primary winding coupled to a magnetic amplifier, said magnetic amplifier having a control winding, the combination of two parallel paths across the output circuit, the first containing a primary of a transformer and the second a rectifier and an impedance in series, a connection from the secondary of the last mentioned transformer to the junction of said two impedances, the last-mentioned connection including a rectifier, a filter and a discharge tube, a vacuum tube triode having its anode connected with said control winding, and a connection from the grid of said triode coupled to said junction, the last-mentioned connection comprising two cascade connected triode amplifier tubes.

3. In an alternating current regulator having an input circuit comprising a step-up transformer having a secondary winding connected to an output circuit and a primary winding coupled to a magnetic amplifier, said magnetic amplifier having a control winding, the combination of two parallel paths across the output circuit, the first containing a primary of a transformer and the second a rectifier and resistor in series, a connection from the secondary of the last mentioned transformer to the junction between the rectifier and resistor, the last-mentioned connection including a rectifier, a filter, a grounded gas discharge diode, and another rectifier, a connection from one terminal of the control winding of the magnetic amplifier to said diode, a vacuum tube triode having its anode connected with the other terminal of said control winding, and a connection from the grid of said triode coupled to the junction in said second path, the last-mentioned connection comprising two cascade connected triode amplifier tubes.

4. In an alternating current regulator having an input circuit comprising a step-up transformer having a secondary winding connected to an output circuit and a primary winding coupled to a magnetic amplifier, said magnetic amplifier having a control winding, the combination of two alternating current windings for the magnetic amplifier, parallel connections for said windings in series with the step-up transformer primary across the input circuit, a rectifier in one connection, an oppositely poled rectifier in the other connection, two parallel paths across the output circuit, the first containing a primary of a transformer and the second a rectifier and resistor in series, a connection from the secondary of the last mentioned transformer to the junction between the rectifier and resistor, the last-mentioned connection including a rectifier, a filter, a grounded gas discharge diode, and another rectifier, a connection from one terminal of the control winding of the magnetic amplifier to said diode, a vacuum tube triode having its anode connected with the other terminal of said control winding, and a connection from the grid of said triode coupled to the junction in said second path, the last-mentioned connection comprising two cascade connected triode amplifier tubes.

5. In an alternating current regulator having an input circuit comprising a step-up transformer having a secondary winding connected to an output circuit and a primary winding coupled to a magnetic amplifier, said magnetic amplifier having a control winding, the combination of two parallel paths across the output circuit, the first containing a transformer having a primary and secondary winding, said primary winding comprising said path, and the second two impedances in series, a connection from the secondary winding of the last-mentioned transformer to the junction of said two impedances, the last mentioned connection including a rectifying and filtering means, a control circuit coupled between said control winding and said junction in said second path for controlling the impedance of said control winding.

References Cited in the file of this patent or the original patent

UNITED STATES PATENTS

| | | |
|---|---|---|
| 1,996,041 | Emmerling | Mar. 26, 1935 |
| 2,331,131 | Moyer | Oct. 5, 1943 |
| 2,650,341 | Jones | Aug. 25, 1953 |